Figure 1:
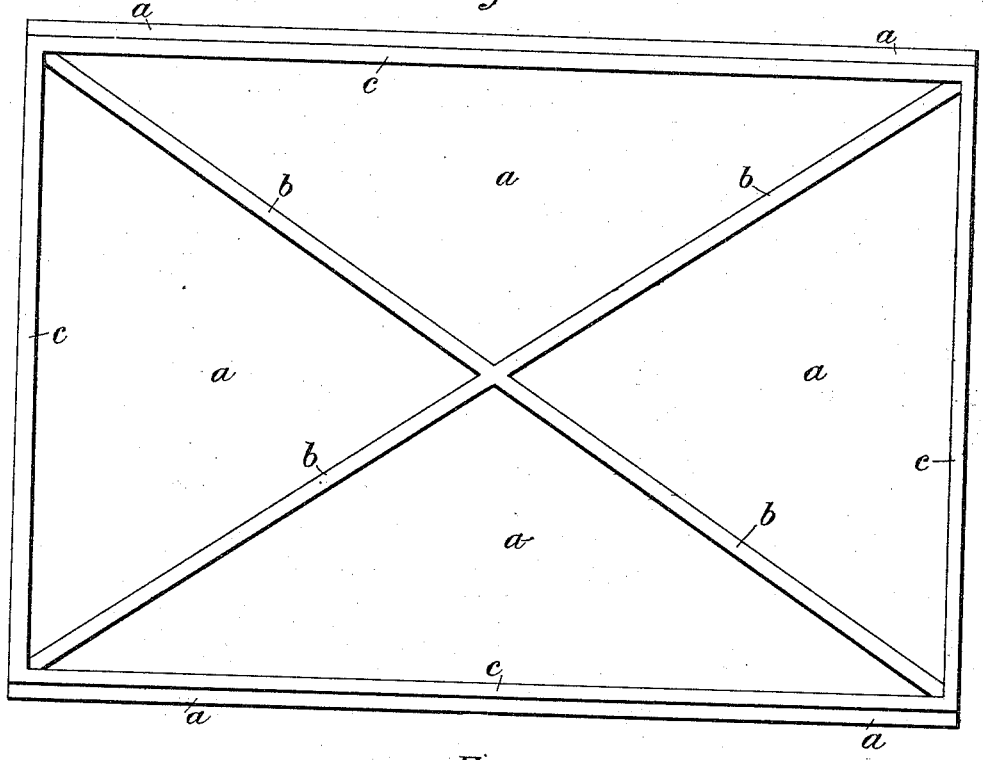

(No Model.)

G. F. CHANCE & J. E. SCOTT.
FLATTENING STONE FOR FLATTENING PLATE GLASS.

No. 542,552. Patented July 9, 1895.

Witnesses:—
George Shaw
Richard Skerrett

Inventors:—
George Ferguson Chance
Joseph Edward Scott

United States Patent Office.

GEORGE FERGUSON CHANCE, OF WEST SMETHWICK, AND JOSEPH EDWARD SCOTT, OF WEST BROMWICH, ASSIGNORS TO THE CHANCE BROTHERS & COMPANY, LIMITED, OF WEST SMETHWICK, ENGLAND.

FLATTENING-STONE FOR FLATTENING PLATE-GLASS.

SPECIFICATION forming part of Letters Patent No. 542,552, dated July 9, 1895.

Application filed April 15, 1895. Serial No. 545,809. (No model.) Patented in France October 2, 1894, No. 241,801, and in Belgium October 2, 1894, No. 112,088.

*To all whom it may concern:*

Be it known that we, GEORGE FERGUSON CHANCE, of West Smethwick, and JOSEPH EDWARD SCOTT, of West Bromwich, England, subjects of the Queen of Great Britain, have invented certain new and useful Improvements in or Substitutes for the Flattening-Stones Employed in the Flattening of Sheet-Glass, (for which we have obtained Letters Patent of France, No. 241,801, dated October 2, 1894, and of Belgium, No. 112,088, dated October 2, 1894;) and we do hereby declare that the following is a full, clear, and exact description of the invention, which will enable others skilled in the art to which it appertains to make and use the same.

The flattening-stones ordinarily employed in the flattening of sheet-glass consist of flat slabs of natural stone or of burnt fire-clay, the surface of which has been made approximately true. Glass flattened on the surface of the said stones is generally more or less injured by markings, and in some cases spoiled thereby.

In order to prevent the marking of the glass in the process of flattening, it has been customary to place on the said stone a "lagre"—that is, a sheet of glass of a size larger than that of the sheets of glass to be flattened—the upper surface of which lagre has been coated with a protective material to prevent the sticking together of the said lagre and the sheets of glass flattened on it.

Our invention consists in making flattening-stones or substitutes for flattening-stones in the manner hereinafter described and illustrated in the accompanying drawings, by the use of which the marking of the glass is wholly or in great part obviated and the lagre referred to rendered unnecessary.

In making, according to our invention, a substitute for the flattening-stones ordinarily employed in the flattening of sheet-glass we proceed as follows:

We make a metal slab, preferably of cast-iron, the under surface of which has ribs formed on it in the casting process for the purpose of obtaining strength with lightness and for preventing the warping of the slab by changes of temperature. We plane the upper surface of the said slab in an ordinary planing-machine, and, after having made the said upper surface a practically true plane, we preferably groove the said surface by finally planing in it a series of fine parallel grooves, say six or seven to the inch. The coating, applied as hereinafter described, attaches itself more securely to a grooved than to an ungrooved surface.

We treat the planed and grooved surface in the following manner: We heat the slab to a dull-red heat, so as to burn off any grease or organic matter which may be on it. The heating of the slab has also the effect of making the surface slightly rough, so that the coating hereinbefore described adheres the better thereto. The slab may be heated in a muffle or heating-chamber, and after heating is slowly cooled by the spontaneous cooling of the said muffle or chamber, so as to leave the slab in an annealed state.

We coat the upper flat surface of the cooled slab with a fireproof composition consisting of sulphate of baryta and silicate of soda in the proportion of about six parts by weight of sulphate of baryta to one part by weight of silicate of soda; but we do not limit ourselves to these precise proportions.

In applying the mixture of sulphate of baryta and silicate of soda to the iron slab we proceed as follows: We add to the said mixture sufficient water to produce a semi-liquid mixture having about the consistency of molasses. We apply this semi-liquid mixture to the iron slab by means of a soft brush. We spread it thinly and uniformly over the surface of the iron slab to a thickness of about one thirty-second of an inch. We allow the coating to partially dry by the spontaneous evaporation of the water at ordinary atmospheric temperature. Before the first coating is quite dry we apply a second coating, and before the second coating is quite dry we apply a third coating, or we may apply more than three coatings. We do not limit ourselves to any particular thickness of the combined coatings; but in practice we have found that a thickness of one-eighth of an inch in the combined coatings answers well. When the last coating is quite dry and hard, the surface of the coating on the slab is made true by rubbing it with an iron rubber and sand, the sand first used being coarse and that used subsequently for finishing being fine. After the rubbing down, the finished coating has a thickness of about one-sixteenth ($\frac{1}{16}$) part of an inch. The slab treated as described is heated or burned to a dull-red heat, by which treatment the coating is further hardened and at the same time attached to the iron of the slab. If after the heating or burning process any roughness or projection on the surface of the coating is observed, the said surface is rubbed with fine sand in the way hereinbefore described and the said roughness or projection on the surface removed.

The sulphate of baryta which we employ is preferably artificially prepared—that is, by precipitating a solution of chloride of barium or other soluble barium salt by means of sulphuric acid or by means of a solution of a soluble sulphate of soda or potash or other soluble sulphate. We do not, however, limit ourselves to the employment of artificially-prepared sulphate of baryta, as the native sulphate of baryta may be employed. When, however, the native sulphate of baryta is employed, it is important that it should be reduced to the state of an almost impalpable powder by grinding and sifting or otherwise.

The silicate of soda which we employ is an article of commerce. In place of silicate of soda, silicate of potash may be employed; but we prefer silicate of soda.

Although we prefer to use a mixture of sulphate of baryta and silicate of soda, as described, for coating the iron slab, yet earthy and refractory ingredients—such, for example, as phosphate of lime, burnt clay, Portland cement, or quicklime—may be added to the mixture of sulphate of baryta and silicate of soda to the extent of about one part by weight of the said earthy and refractory materials to about six parts by weight of sulphate of baryta. The addition of these earthy and refractory materials in the proportions mentioned does not improve the coating mixture or materially affect it in any way; but it somewhat reduces the cost of the coating mixture.

In order that our invention may be the better understood, we have represented in the accompanying drawings a slab or substitute for a flattening-stone made according to our invention.

Figure 2:
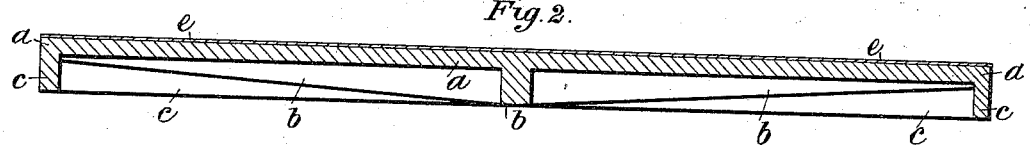
Figure 3:
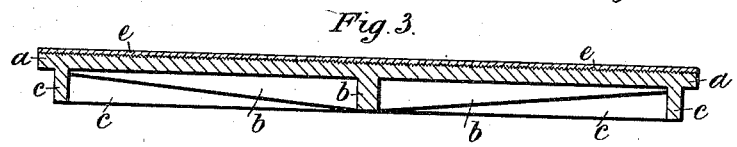
Figure 4:
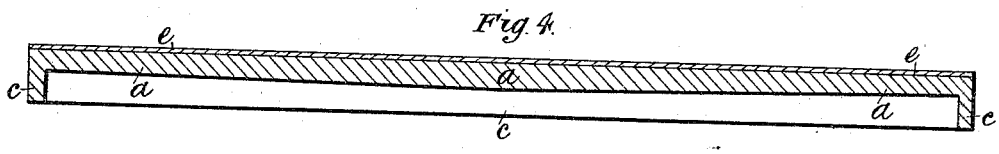

Figure 1 represents a plan of the under side of the slab; Fig. 2, a longitudinal section through the middle of the said slab, and Fig. 3 a cross-section through the middle of the slab. Fig. 4 is a modified slab.

On the under side of the slab $a$ are four or other number of radiating ribs $b\ b\ b\ b$, the said ribs terminating in the marginal rim $c$.

$e$ is the fireproof coating of sulphate of baryta and silicate of soda, with or without the addition of the other ingredients hereinbefore referred to.

We do not limit ourselves to any particular construction of the slab $a$. For example, the ribs $b\ b\ b\ b$ may be dispensed with, as illustrated in Fig. 4. In this case the slab $a$ is made somewhat thicker at its middle than when the radiating ribs are used and tapers toward its marginal flange, as represented in the drawings.

Slabs made according to our invention may be fitted to the carriages ordinarily used in flattening sheet-glass. The slab should be supported on the carriage, preferably at four points, by packing-pieces inserted between the flange of the slab and the carriage at about a distance from each end of each longer side of the slab equal to one-fifth of the whole length of the slab.

If during the use of the slab sinking occurs at any point or points of the slab, the level of the said slab may be restored by introducing a packing piece or pieces under the sunken part or parts. The iron under the heat of the flattening-furnace will yield sufficiently to regain its level by the action of the said packing-pieces.

Having now particularly described and ascertained the nature of our invention and in what manner the same is to be performed, we declare that we claim as our invention—

A flattening stone or substitute for flattening stones employed in the flattening of sheet glass which consists of metallic slabs, the upper or acting surfaces of which are coated with a fire-proof composition consisting essentially of a mixture of sulphate of baryta and silicate of soda or silicate of potash, substantially as described.

GEORGE FERGUSON CHANCE. [L. S.]
  JOSEPH EDWARD SCOTT. [L. S.]

Witnesses:
  GEORGE SHAW,
  RICHARD SKERRETT.